US010029477B2

(12) United States Patent
Yamasaki

(10) Patent No.: US 10,029,477 B2
(45) Date of Patent: Jul. 24, 2018

(54) NAIL PRINTING APPARATUS, METHOD OF CONTROLLING THE NAIL PRINTING APPARATUS, AND COMPUTER READABLE RECORDING MEDIUM

(71) Applicant: CASIO COMPUTER CO., LTD., Shibuya-ku, Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 236 days.

(21) Appl. No.: 14/975,000

(22) Filed: Dec. 18, 2015

(65) Prior Publication Data

US 2016/0174680 A1 Jun. 23, 2016

(30) Foreign Application Priority Data

Dec. 19, 2014 (JP) ................................ 2014-257044

(51) Int. Cl.
*G06K 15/22* (2006.01)
*B41J 3/407* (2006.01)
*A45D 29/00* (2006.01)

(52) U.S. Cl.
CPC ......... *B41J 3/407* (2013.01); *A45D 2029/005* (2013.01)

(58) Field of Classification Search
None
See application file for complete search history.

(56) References Cited

U.S. PATENT DOCUMENTS 5,931,166 A * 8/1999 Weber .................... A45D 34/04 132/200
6,067,996 A * 5/2000 Weber .................... A45D 34/04 132/200

(Continued)

FOREIGN PATENT DOCUMENTS

CN 101030119 A 9/2007
CN 104042025 A 9/2014

(Continued)

OTHER PUBLICATIONS

Chinese Office Action (and English translation thereof) dated Dec. 2, 2016 issued in counterpart Chinese Application No. 201410258274.0.

(Continued)

*Primary Examiner* — Ted Barnes
(74) *Attorney, Agent, or Firm* — Holtz, Holtz & Volek PC

(57) ABSTRACT

A nail printing apparatus is provided, which does not require a user to manipulate button operation to set user's finger or user's toe or start an image drawing operation. The apparatus provided with an image drawing unit for drawing an image on a nail of a finger or a nail of a toe and an elevation mechanism having a placing unit on which the finger or the toe is placed. The elevation mechanism moves the placing unit from a stand-by position up to an image drawing position. When the placing unit is at the stand-by position, the user can insert user's finger or user's toe into or remove user's finger or user's toe from the apparatus. When at the image drawing position, the image drawing unit can draw an image on the nail of the finger. An elevation controlling unit controls the operation of the elevation mechanism in response to an operation of the finger or the toe placed on the placing unit, pressing the same downward.

17 Claims, 10 Drawing Sheets

(56) References Cited

U.S. PATENT DOCUMENTS

| | | | | |
|---|---|---|---|---|
| 6,286,517 | B1 * | 9/2001 | Weber | A45D 29/00 132/200 |
| 6,336,694 | B1 * | 1/2002 | Ishizaka | A45D 29/00 347/105 |
| 6,525,724 | B1 * | 2/2003 | Takami | A45D 29/00 345/418 |
| 7,123,983 | B2 | 10/2006 | Pogo et al. | |
| 8,757,171 | B2 * | 6/2014 | Goff | A45D 29/00 101/35 |
| 8,814,289 | B2 | 8/2014 | Yamasaki | |
| 9,156,282 | B2 * | 10/2015 | Yamasaki | B41J 3/4073 |
| 2004/0194648 | A1 | 10/2004 | Uchida | |
| 2004/0227738 | A1 | 11/2004 | Sudoh | |
| 2011/0108047 | A1 * | 5/2011 | Goff | A45D 29/00 132/73.5 |
| 2012/0147113 | A1 * | 6/2012 | Yamasaki | A45D 29/00 347/104 |
| 2013/0242019 | A1 * | 9/2013 | Bitoh | A45D 29/00 347/104 |
| 2014/0267517 | A1 * | 9/2014 | Yamasaki | B41J 3/4073 347/101 |

FOREIGN PATENT DOCUMENTS

| | | | |
|---|---|---|---|
| JP | 2003256840 | A | 9/2003 |
| JP | 2003534083 | A | 11/2003 |
| JP | 2004216872 | A | 8/2004 |
| JP | 2006519030 | A | 8/2006 |
| JP | 2012152410 | A | 8/2012 |
| JP | 2012232414 | A | 11/2012 |
| JP | 2013156683 | A | 8/2013 |
| JP | 2013188348 | A | 9/2013 |
| JP | 2014121344 | A | 7/2014 |
| JP | 2014176441 | A | 9/2014 |

OTHER PUBLICATIONS

Chinese Office Action (and English translation thereof) dated Dec. 1, 2016 issued in counterpart Chinese Application No. 201510956881.9.

* cited by examiner

NAIL PRINTING APPARATUS, METHOD OF CONTROLLING THE NAIL PRINTING APPARATUS, AND COMPUTER READABLE RECORDING MEDIUM

CROSS-REFERENCE TO RELATED APPLICATION

The present application is based upon and claims the benefit of priority from the prior Japanese Patent Application No. 2014-257044, filed Dec. 19, 2014, the entire contents of which are incorporated herein by reference.

BACKGROUND OF THE INVENTION

1. Field of the Invention

The present invention related to a nail printing apparatus, a method of controlling the nail printing apparatus, and a computer readable recording medium.

2. Description of the Related Art

Now, nail printing apparatuses are known, which print a nail design on the nail of the finger of the user. Using this kind of apparatus, the user is not required to drop in a nail salon to ask for printing a nail design, and he or she can enjoy nail printing comfortably.

A nail art operating apparatus is proposed in Japanese Unexamined Patent Publication No. 2004-216872, which apparatus fixes a finger, on whose nail an image is to be drawn, and uses a pad for transferring ink to print an image on the nail.

In the nail art operating apparatus disclosed in Japanese Unexamined Patent Publication No. 2004-216872, when a user operates a set button of a control panel, a finger catching unit closes and fixes user's finger tip and an image drawing operation starts drawing an image on the nail. When the image drawing operation of drawing a designated picture on the nail has finished, the finger catching unit opens to release the finger.

There are cases where the user is drying an image drawn on the nail of one hand or is doing something with one hand, when the user wants to draw an image on the other hand. Therefore, it will be troublesome for the user to manipulate an operation button for setting the finger or starting drawing an image.

When the user wants to draw an image on the nail of the dominant hand, the user is required to executing troublesome operation, manipulating the operation button with the other hand. Further, when the user wants to print on both hands simultaneously, the apparatus such requiring user's manual operation for setting the finger or drawing an image will be inconvenient, since the user is required to draw an image one hand by one hand.

According to the present invention, there are provided a nail printing apparatus, a method of controlling the nail printing apparatus, and a computer readable recording medium, which allow the user to give instructions of setting the finger and starting drawing an image on the nail, without executing manual operation.

SUMMARY OF THE INVENTION

According to one aspect of the invention, there is provided a nail printing apparatus which comprises an image drawing unit which draws an image on a nail of a finger of a user or a nail of a toe of a user, an elevation mechanism having a placing unit on which the finger or the toe is placed, which mechanism moves the finger or the toe placed on the placing unit from a stand-by position up to an image drawing position and vice versa, wherein the stand-by position allows the user to insert user's finger or user's toe into the apparatus or remove user's finger or user's toe from the apparatus and the image drawing position allows the image drawing unit to draw an image on the nail of the finger or the nail of the toe placed on the placing unit, and an elevation controlling unit which controls an operation of the elevation mechanism, wherein the elevation controlling unit controls the operation of the elevation mechanism of moving the finger or the toe between the stand-by position and the image drawing position, in response to an operation of the finger or the toe placed on the placing unit, pressing the placing unit downward.

According to another aspect of the invention, there is provided a nail printing apparatus which comprises an image drawing unit which draws an image on a nail of a finger of a user or a nail of a toe of a user, an elevation mechanism having a placing unit on which the finger or the toe is placed, which mechanism moves the finger or the toe placed on the placing unit from a stand-by position up to an image drawing position and vice versa, wherein the stand-by position allows the user to insert user's finger or user's toe into the apparatus or remove user's finger or user's toe from the apparatus and the image drawing position allows the image drawing unit to draw an image on the nail of the finger or the nail of the toe placed on the placing unit, an elevation controlling unit which controls an operation of the elevation mechanism, a pressing unit which presses down the back side of the finger or the toe placed on the placing unit, on whose nail an image is to be drawn, wherein the elevation controlling unit controls the operation of the elevation mechanism of moving the finger or the toe between the stand-by position and the image drawing position, in response to an operation of the finger or the toe placed on the placing unit, pressing the placing unit downward, and when the finger or the toe is inserted between the placing unit and pressing unit, the placing unit moves the finger or the toe upward to hold said finger or said toe firmly between the placing unit and pressing unit.

In the nail printing apparatus according to the embodiment of the invention, the user can set user's finger or user's toe to the apparatus or start a printing operation without manipulating the operation button.

Additional objects and advents of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate the embodiments of the invention, and together with the general description given above and the detailed description of the embodiments given below, serve to explain the principles of the invention.

DETAILED DESCRIPTION OF THE PREFERRED EMBODIMENTS

An embodiment of a nail printing apparatus according to the present invention will be described with reference to the accompanying drawings in detail. In the embodiments described in the following description, although various preferable technical limitations are applied to the apparatus for putting the invention into practical use, it will be understood that the invention is neither restricted by these specific limitations nor limited to the particular embodiments described herein. In the embodiments of the invention, an image drawing apparatus will be described as a device used for drawing an image on the surface of a nail of a finger. But the image drawing apparatus can be used not only for drawing an image on the nail of a finger but also for drawing an image on the nail of a toe.

Figure 1:
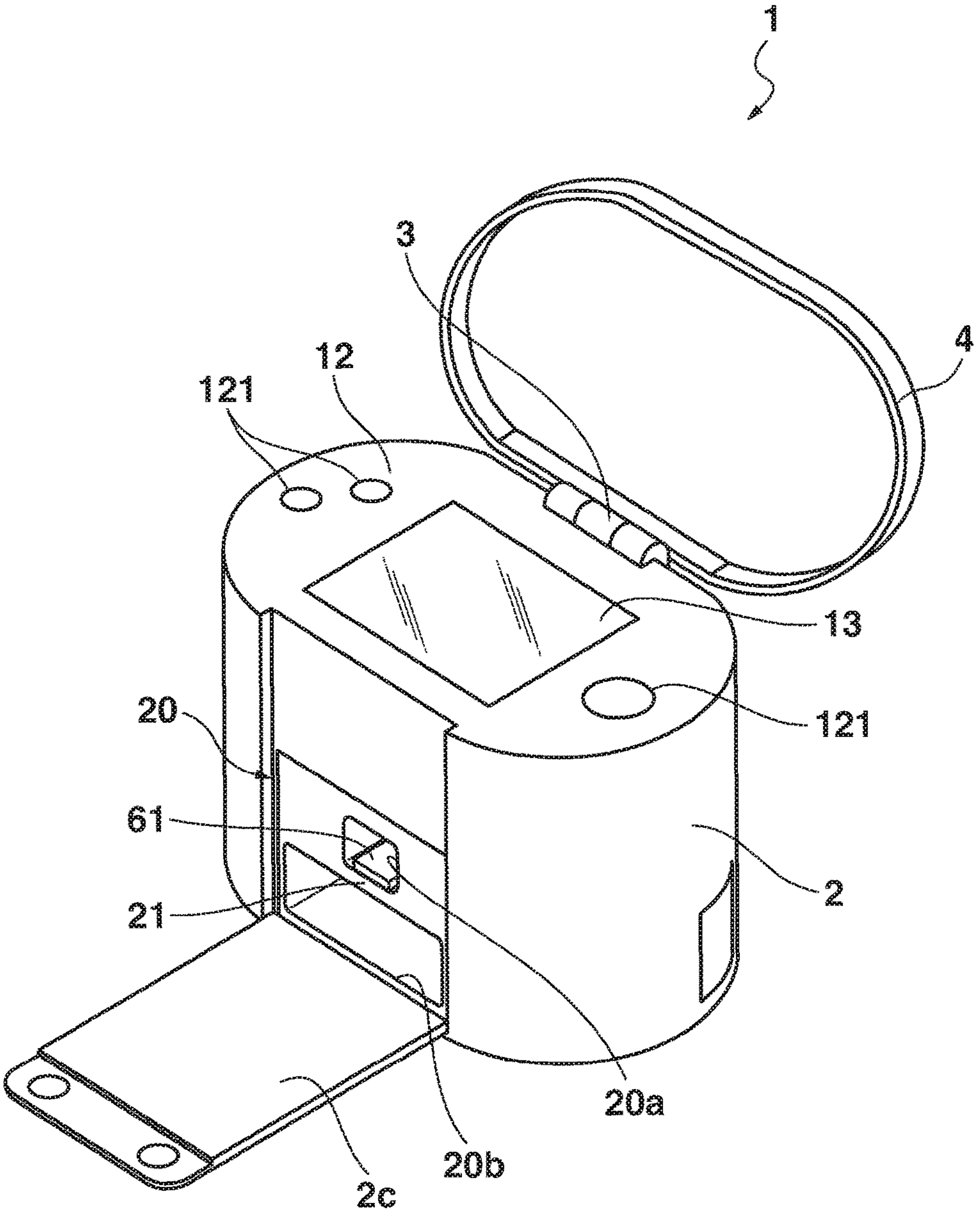
FIG. 1 is a perspective view showing an external appearance of a nail printing apparatus according to the embodiment of the invention.
Figure 2:
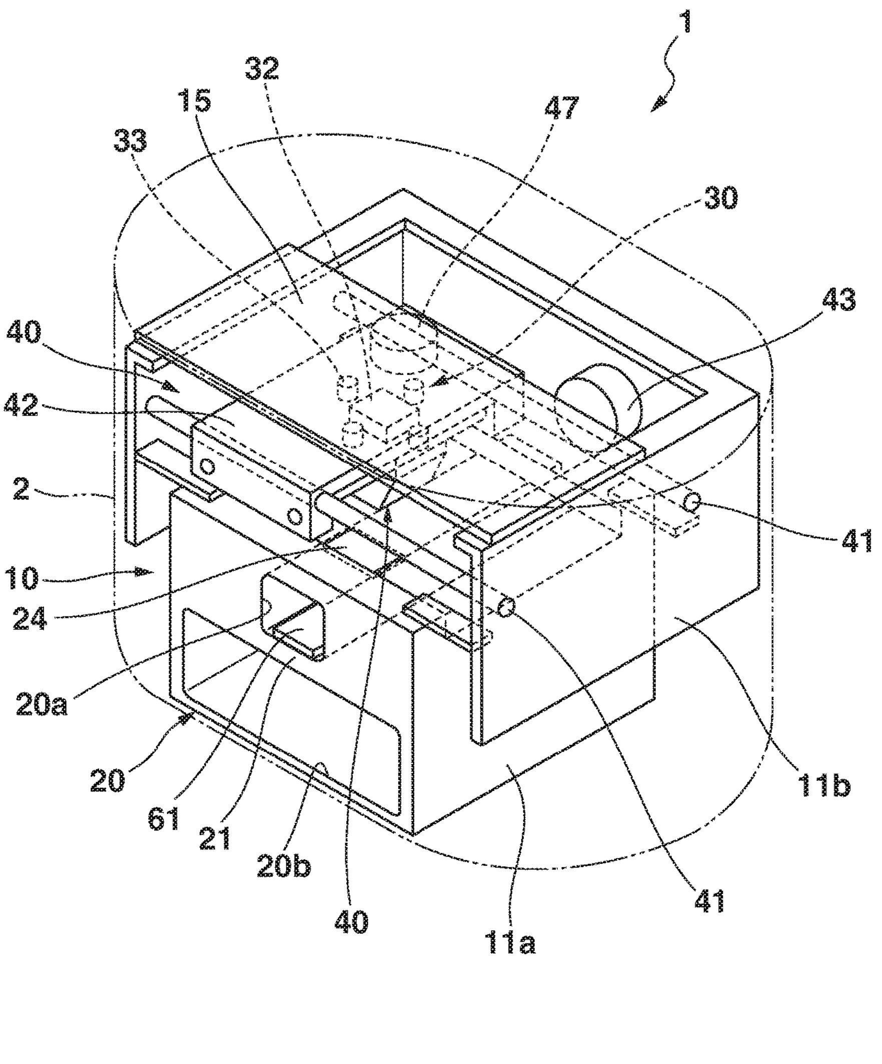
FIG. 2 is a perspective view showing an internal configuration of the nail printing apparatus according to the present embodiment of the invention.

FIG. 1 is a perspective view showing an external appearance of the nail printing apparatus according to the present embodiment of the invention. FIG. 2 is a perspective view showing an internal configuration of the nail printing apparatus according to the present embodiment of the invention.

As shown in FIG. 1, the nail printing apparatus 1 consists of a case body 2 and a lid body 4. The lid body 4 is rotatably connected to the case body 2 by means of a lid hinge 3 provided at the rear end portion of the top surface of the case body 2. With the lid hinge 3 as the supporting point the lid body 4 can rotate form a position where the lid body 2 covers the top surface of the case body 2 to a position where the lid body 2 stands on the top surface of the case body 2 (Refer to FIG. 1).

The case body 2 is formed substantially in a semi-cylindrical shape, and is provided with an opening-closing plate 2*c* on its front side. The opening-closing plate 2*c* is rotatably connected to the case body 2 by means of a hinge (not shown) provided at the front bottom portion of the case body 2. The opening-closing plate 2*c* is prepared for purpose of opening the front side of the case body 2 as shown in FIG. 1. The shapes and configurations of the case body 2 and the lid body 4 are not limited to the particular examples illustrated in FIG. 1.

There is provided an operation unit 12 on the top surface (top plate) of the case body 2.

The operation unit 12 is used by a user to enter various sorts of information. The operation unit 12 includes various buttons 121, 121, such as a power switch button for turning on the nail printing apparatus 1, a design selecting button (s) for selecting a design image to be drawn on a nail T, and an operation button(s) for entering various sorts of information.

The case body 2 is provided with a displaying unit 13 substantially at the center of its top surface (top plate).

The displaying unit 13 is composed of, for example, a liquid crystal display device, an organic electroluminescence display device, and/or other flat display device. In the present embodiment of the invention, the displaying unit 13 appropriately displays an image (hereinafter, the "finger image") of a photographed finger (print finger) U1, a nail image (an image of the outline of the nail T) included in the finger image, a design selection screen for selecting a design image to be drawn on the nail T, a thumb-nail image for confirmation of the selected design image, an instruction screen for indicating various instructions, a notice screen, and a warning screen.

It is possible to install a touch panel integrally on the displaying surface of the displaying unit 13, which allows the user to touch on the surface of the displaying unit 13 with a stylus pen (not shown) or user's finger to enter various sorts of information.

The case body 2 accommodates the apparatus body 10 of the nail printing apparatus 1.

Figure 3:
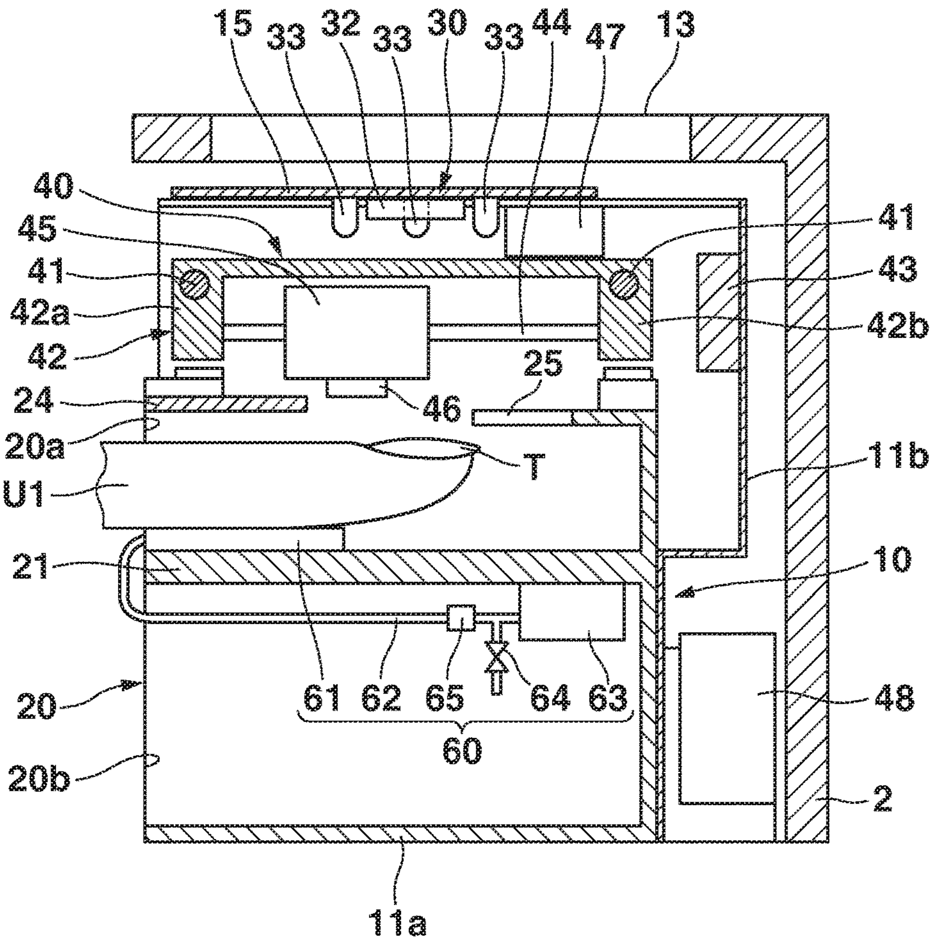
FIG. 3 is a cross-sectional view of an apparatus body of the nail printing apparatus according to the embodiment of the invention.

FIG. 3 is a cross-sectional view of the apparatus body 10 of the nail printing apparatus 1 according to the present embodiment of the invention.

As shown in FIG. 2 and FIG. 3, the apparatus body 10 is formed substantially in a box shape, and is provided with a lower mechanical frame 11*a* and an upper mechanical frame 11*b*, both accommodated in the case body 2. The lower mechanical frame 11*a* is mounted in the lower portion of the case body 2 and the upper mechanical frame 11*b* is mounted on the upper side of the lower mechanical frame 11*a* and in the upper portion of the case body 2. The apparatus body 10 (the lower mechanical frame 11*a* and the upper mechanical frame 11*b*) is provided with a print-finger fixing unit 20, a photographing unit 30, an image drawing unit 40, and a controlling device 50 (Refer to FIG. 6).

The print-finger fixing unit 20 is provided on the lower mechanical frame 11*a*. More specifically, the lower mechanical frame 11*a* is provided with a print-finger receiving unit 20*a* and a non-print finger receiving unit 20*b*. The print-finger fixing unit 20 is composed of the print-finger receiving unit 20*a* and the non-print finger receiving unit 20*b*. The print-finger receiving unit 20*a* is separated from the non-print finger receiving unit 20*b* by a separation wall 21.

The print-finger receiving unit 20*a* is a finger receiving unit where a finger (hereinafter, the "print finger" U1) is inserted. The print finger U1 has a nail T on which an image is to be drawn (Refer to FIG. 3). The print-finger receiving unit 20*a* has an opening at its upper portion, allowing the nail T of the print-finger U1 inserted thereto to expose through the opening. In the present embodiment of the nail printing apparatus 1, the case will be described as one example, in which case the user inserts user's fingers into the print-finger receiving unit 20*a* one by one to draw an image on the nail T of the inserted finger (the print finger U1). The shape and size of the print-finger receiving unit 20*a* are not especially limited, but the print-finger receiving unit 20*a* will be formed in shape and size well enough to receive any finger of an adult.

The non-print finger receiving unit 20*b* is a finger receiving unit where a finger(s) (hereinafter, the "non-print finger(s)") other than the print finger U1 is inserted.

In the present embodiment of the nail printing apparatus 1, the user inserts user's print finger U1 and non-print finger(s) into the print-finger receiving unit 20*a* and the non-print finger receiving unit 20*b*, respectively, and holds the separation wall 21 with user's print finger U1 and non-print finger(s), whereby the user's print finger U1 will be fixed in a steady state.

The configuration of the print-finger receiving unit 20*a* in the nail printing apparatus 1 of the present embodiment will be described in detail with reference to FIG. 4A to FIG. 4D) and FIG. 5A to FIG. 5C.

FIG. 4A to FIG. 4C and FIG. 5A to FIG. 5C are cross-sectional side views schematically showing the print-finger receiving unit 20*a*. FIG. 4D is a plan view showing the print-finger receiving unit 20*a* viewed from the direction indicated by an arrow "d" in FIG. 4C.

As shown in FIG. 4A to FIG. 4D, the print-finger receiving unit 20*a* is provided with a finger pressing plate 24 at its upper opening side (the left side in FIG. 3), which plate 24 presses the back side of the inserted print finger U1. In the following description, "the back side of the inserted print finger", "the back of the finger", and "the back of the toe" represent the outer side of the inserted print finger, the outer side of the finger, and the upper side of the toe, respectively. The back of the finger (toe) indicates the same side as the nail of the finger (toe).

The finger pressing plate 24 is made of a board member, and is mounted at a fixed position. When the print finger U1 received in the print-finger receiving unit 20*a* is moved upward, the back side of the print finger U1 abuts on the under surface of the finger pressing plate 24, whereby the print finger U1 is prevented form moving upward excessively and is vertically held at a proper level (Refer to FIG. 4C).

Figure 4A:
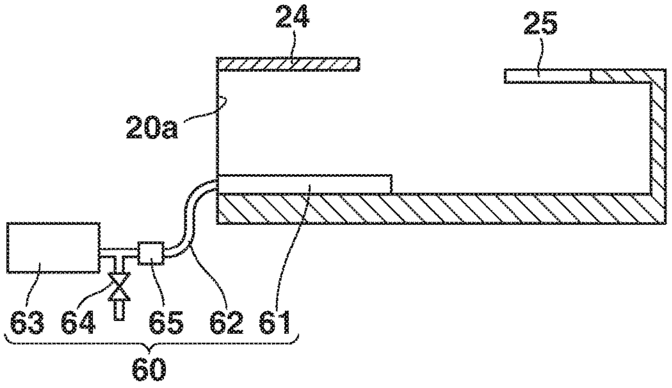
FIG. 4A to FIG. 4C are cross-sectional side views schematically showing a print-finger receiving unit.

The print-finger receiving unit 20*a* is provided with a nail rest 25 at the innermost part thereof (the right side in FIG. 4A). The nail rest 25 is disposed such that the tip of the nail T of the print finger U1 will be placed thereon, as shown in FIG. 4C, when the finger U1 has been inserted into the print-finger receiving unit 20*a*. In the present embodiment, the tip of the nail T is placed on the nail rest 25 with the back side of the print finger U1 abutted on the under surface of the finger pressing plate 24 and further with the print finger U1 pressed upward by a finger placing member 61 (to be described later) to a position allowing the image drawing unit 40 to draw an image on the nail T (Refer to FIG. 4C and FIG. 4D).

The nail rest 25 is formed of a gum and/or resin material. The material used for forming the nail rest 25 is not limited to those described herein, but materials which are hard to change in quality as a result of adhesion of ink are preferable for making the nail rest 25, and further somewhat flexible materials are preferable since these materials release the tip of the nail T from load of the nail rest 25.

It is possible to keep the nail T in a stable state and hold the vertical position of the nail T constant by placing at least the tip of the nail T on the nail rest 25.

Figure 4B:
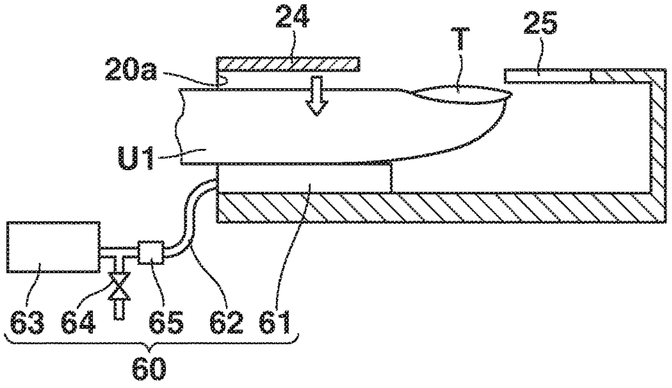
Figure 4C:
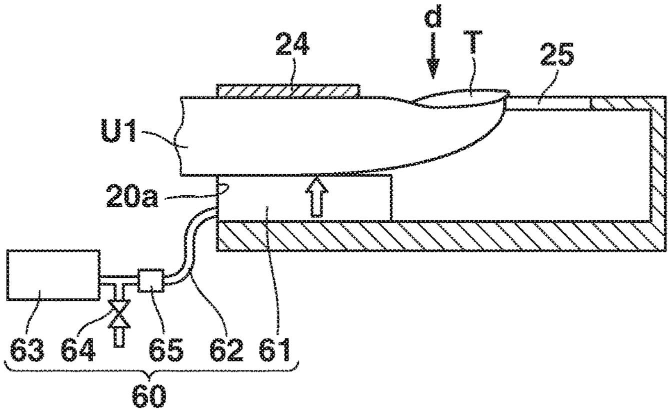
Figure 4D:
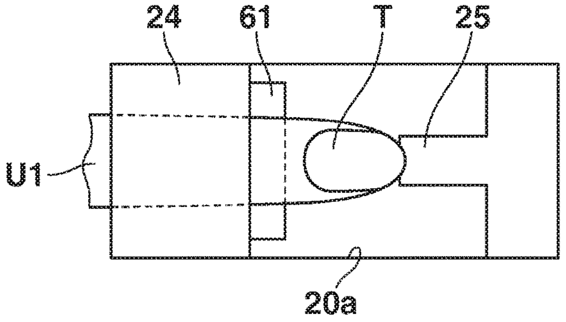
FIG. 4D is a plan view showing the print-finger receiving unit viewed from the direction indicated by an arrow "d" in FIG. 4C.

The height and size of the nail rest 25 are not restricted to those shown in FIG. 4B and FIG. 4C. When the nail rest 25 is held higher than the level of the under surface of the finger pressing plate 24, it is necessary to bend the finger tip of the print finger U1 substantially upward from the part of the finger restricted by the finger pressing plate 24, whereby the user is required to take an unnatural posture. Therefore, it is preferable to mount the nail rest 25 at a position lower than the level of the under surface of the finger pressing plate 24.

The finger placing member 61 is provided inside the print-finger receiving unit 20*a* (Refer to FIGS. 4A, 4B). The print finger U1 is placed on the finger placing member 61. The finger placing member 61 serves to move the print finger U1 from a stand-by position where the print finger U1 can be inserted into or removed from the nail printing apparatus 1 to an image-drawing position where an image can be drawn on the nail T with the back side of the print finger U1 pressed against the finger pressing plate 24.

The finger placing member 61 is an expandable/contractible member which utilizes fluid. The finger placing member 61 is connected with a communication tube 62 and the communication tube 62 is connected with a pump 63 for sending the fluid into the tube 62, a valve 64 for discharging the fluid from the finger placing member 61, and a pressure sensor 65 for detecting a pressure within the finger placing member 61.

In the present embodiment, an elevating mechanism 60 is composed of the finger placing member 61, the pump 63, the valve 64 and the pressure sensor 65.

As shown in FIG. 3, the elements composing the elevating mechanism 60 such as the pump 63, the valve 64 and the pressure sensor 65 are disposed within the non-print finger receiving unit 20*b*. The communication tube 62 connects these elements with the finger placing member 61 provided in the print-finger receiving unit 20*a*. The layout of the communication tube 62, the pump 63, the valve 64 and the pressure sensor 65 is not restricted to those disclosed herein.

In FIG. 4A to FIG. 4C and FIG. 5A to FIG. 5C, the communication tube 62, the pump 63, the valve 64 and the pressure sensor 65 composing the elevating mechanism 60 are shown at the side of the print-finger receiving unit 20*a* for convenience of explanation.

The finger placing member 61 is a member of a bag-shape container, and made of a material such as resin which is rich in elasticity. When air is filled as the fluid, the finger placing member 61 can expand. It is preferable that the finger placing member 61 is covered with a raised cloth to give a good feeling on the finger placed thereon.

The material used for making the finger placing member 61 is not restricted to a particular one, but it is enough for the finger placing member 61 that said member 61 is made of an elastic material.

The fluid to fill the finger placing member 61 is not restricted to air, but various sorts of gas, liquids such as water and oil, and gelatinous materials can be used as the fluid to fill the finger placing member 61.

In the present embodiment, the finger placing member 61 has a configuration of a bag-shape container, which expands to push the print finger U1 upward when the container is filled with the fluid (Refer to FIG. 4B and FIG. 4C). In the present embodiment, the finger placing member 61 can expand until the print finger U1 is fixedly held at the image-drawing position where an image can be drawn on the nail T, when the finger placing member 61 is filled with the fluid (Refer to FIG. 4C and FIG. 5A).

As described above, since the finger placing member 61 is made of the elastic and flexible material, the finger placing member 61 changes its own shape in accordance with the shape of the print finger U1, when the member expands until the print finger U1 will be fixed. Therefore, regardless of the size and shape of the user's print finger U1, it is possible to fix the print finger U1 easily and surely without giving excessive pressing and suffering feeling to the user's finger.

Figure 5A:
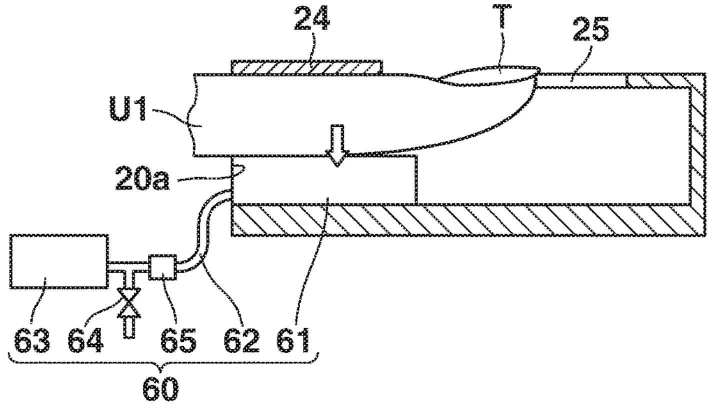
FIG. 5A to FIG. 5C are cross-sectional side views schematically showing the print-finger receiving unit.
Figure 5B:
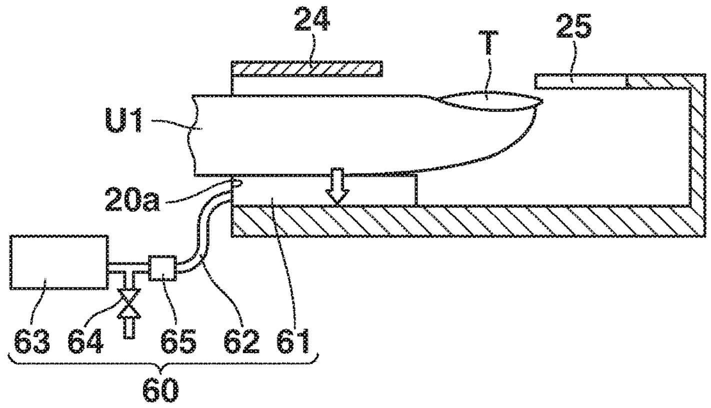
Figure 5C:
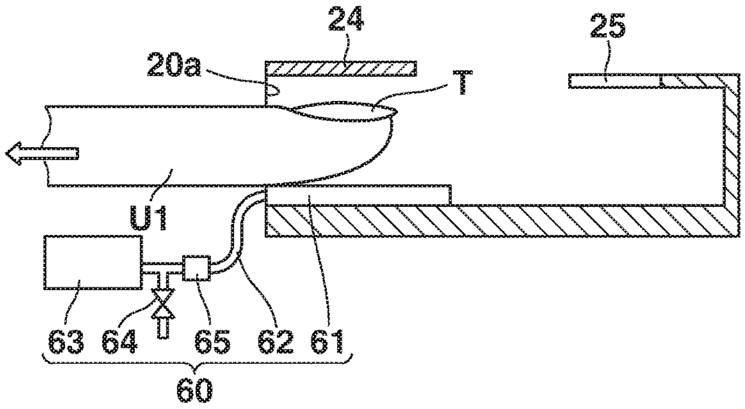

When the air or fluid is discharged, the finger placing member 61 shrinks, allowing the print finger U1 to descend (Refer to FIG. 5B and FIG. 5C). In the present embodiment, the finger placing member 61 can shrink until the print finger U1 descends to the stand-by position where the print finger U1 can be inserted into or removed from the nail printing apparatus 1, when the fluid is discharged from the finger placing member 61 (Refer to FIG. 4B and FIG. 5C).

The communication tube 62 is connected to the finger placing member 61 at its one end and to the pump 63 at the other end.

The pump 63 is composed of a motor, a diaphragm and a valve. The construction and the sort of the pump are not restricted to the particular one, but it is preferable to use a high-precision pump which can control accurately and little by little a volume of the fluid filled in to or discharged from the finger placing member 61.

The driving operation of the pump 63 is controlled depending on an electric signal output from an elevation controlling unit to be described later (Refer to FIG. 6).

The valve 64 is provided on a fluid (air) route between the pump 63 and the finger placing member 61. The valve 64 serves to make the fluid route open, allowing the air (fluid) to discharge from the finger placing member 61. The sort of the valve to be provided between the pump 63 and the finger placing member 61 is not restricted but it is preferable to use a small size and low cost valve. A normal closed micro solenoid valve can be used as this valve, which is made open upon receipt of an electric signal.

The open/close operation of the valve 64 is controlled depending on an electric signal sent from the elevation controlling unit to be described later (Refer to FIG. 6).

The pressure sensor 65 is provided on the fluid (air) route between the pump 63 and the finger placing member 61. The pressure sensor 65 serves to detect a pressure within the finger placing member 61. The sort of the sensor 65 is not restricted but it is preferable to use a sensor which can detect a fine variation in pressure with high sensitivity and high precision. For example, it is possible to use a pressure sensor of a small size which is manufactured using MEMS (Micro-Electro-Mechanical System). MEMS is a fine working technique for integrating various elements on one and the same chip.

Figure 6:
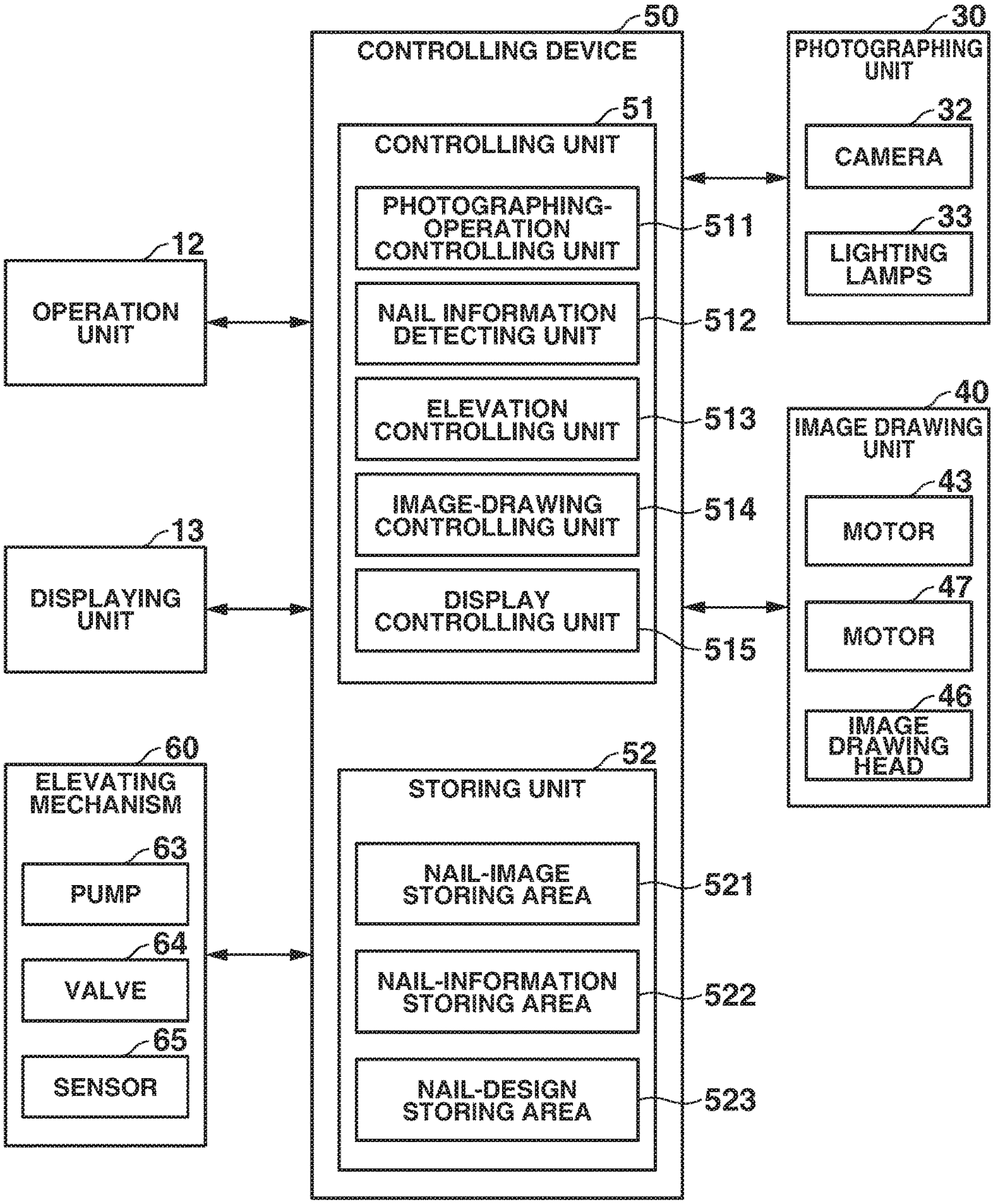
FIG. 6 is a block diagram of a configuration of a controlling device in the nail printing apparatus according to the embodiment of the invention.

The pressure sensor 65 serves to detect a pressure (internal pressure) within the finger placing member 61, outputting the detected result (detected internal pressure) to the elevation controlling unit (Refer to FIG. 6).

The photographing unit 30 is mounted on the upper mechanical frame 11*b*, as shown in FIG. 2 and FIG. 3. More particularly, the upper mechanical frame 11*b* is provided with a base plate 15, and a camera 32 (photographing apparatus) is installed substantially at the center of the undersurface of the base plate 15. It is preferable to use the camera 32 having 2 million pixels and more.

The camera 32 is used to photograph the print finger U1 received in the print-finger receiving unit 20*a* and the nail T of the print finger U1 to obtain a finger image of the print finger U1 and a nail image of the nail T.

Lighting lamps 33, 33 such as white LEDs are mounted on the base plate 15 so as to surround the camera 32. The lighting lamps 33, 33 illuminate the nail T of the print finger U1 when said nail T is photographed by the camera 32. The photographing unit 30 is composed of the camera 32 and the lighting lamps 33, 33.

In the present embodiment, a nail information detecting unit 512 to be described later will detect the outline (nail shape) of the nail T as nail information from the nail image obtained by the camera 32 as the photographing apparatus.

The photographing unit 30 is connected to a photographing-operation controlling unit 511 (to be described later) of the controlling device 50 (Refer to FIG. 6). The operation of the photographing unit 30 is controlled by the photographing-operation controlling unit 511. Image data of the images obtained by the photographing unit 30 is stored in a nail-image storing area 521 of a storing unit 52 to be described later.

The image drawing unit 40 is mainly mounted on the upper mechanical frame 11*b*. More particularly, as shown in FIG. 2 and FIG. 3, two guide rods 41, 41 are provided in parallel on both side boards of the upper mechanical frame 11*b*. A main carriage 42 is mount on the guide rods 41, 41 in a slidable manner thereon. Further, as shown in FIG. 3, a pair of guide rods 44, 44 are provided in parallel between the front wall 42*a* and the rear wall 42*b* of the main carriage 42. A subsidiary carriage 45 is mount on the pair of guide rods 44, 44 in a slidable manner thereon, too. An image drawing head 46 is mounted substantially at the center of the undersurface of the subsidiary carriage 45.

In the present embodiment, the image drawing head 46 is an image drawing head of an ink jet system for forming ink into minute ink droplets to blow them onto the surface of a medium to drawn an image. A recording system of the image drawing head 46 is not restricted to the ink jet system.

In the present embodiment, the image drawing unit 40 has plural image drawing heads 46 corresponding respectively to the inks of Ye (yellow), Ma (magenta), and Cy (cyan). Each image drawing head 46 has a nozzle array including plural nozzles for ejecting ink. The image drawing heads included in the image drawing unit 40 are not limited those ejecting the inks of three colors (Ye, Ma, and Cy) but image drawing heads ejecting ink of other color can be used in addition to these image drawing heads 46.

The image drawing head 46 serves to draw an image (nail design) on the surface of the nail T of the print finger U1 with the back side of the print finger U1 pressed against the finger pressing plate 24 and at least the tip of the nail T placed on the nail rest 25. The image drawing heads 46 draw an image on the surface of the nail T of the print finger U1 in accordance with the nail information detected by the nail-information detecting unit 512 (Refer to FIG. 6).

On the lower mechanical frame 11*a*, there is provided an ink cartridge 48 for supplying the ink to the image drawing heads 46. The ink cartridge 48 is connected to the image drawing heads 46 through supplying tubes (not shown). The ink is properly supplied to the image drawing heads 46 through the supplying tubes. It is also possible to mount the ink cartridge directly on the image drawing head 46.

The main carriage 42 is connected to a motor 43 through a driving-power transmitting unit (not shown) and moves in the rightward or leftward direction in the nail printing apparatus 1 along the guide rods 41, 41 depending on the rotation direction of the motor 43. Meanwhile, the subsidiary carriage 45 is connected to a motor 47 through a driving-power transmitting unit (not shown) and moves in the frontward or rearward direction (rightward or leftward direction in FIG. 3) in the nail printing apparatus 1 along the guide rods 44, 44 depending on the rotation direction of the motor 47.

The image drawing unit 40 is composed of the guide rods 41, 41, the main carriage 42, the motor 43, the guide rods 44, 44, the subsidiary carriage 45, the image drawing heads 46, the motor 47, and the ink cartridge 48. The motor 43, the image drawing heads 46, and the motor 47 are connected to an image-drawing controlling unit 514 (to be described later) (Refer to FIG. 6) of the controlling device 50 and are controlled by the image-drawing controlling unit 514.

The controlling device 50 is mounted on the base plate 15 of the upper mechanical frame 11*b*. FIG. 6 is a block diagram of a configuration of the controlling device 50 according to the present embodiment of the invention.

As shown in FIG. 6, the controlling device 50 is a sort of a computer which comprises a controlling unit 51 including CPU (Central Processing Unit) (not shown) and the storing unit 52 consisting of ROM (Read Only Memory) and RAM (Random Access Memory).

Various sorts of programs and various sorts of data required for operating the nail printing apparatus 1 are stored in the storing unit 52.

More specifically, various sorts of programs such as a nail-information detecting program for detecting nail information of the nail T and an image drawing program for performing an image drawing process, and various sorts of data including a first threshold value and a second threshold value are stored in the storing unit 52. The elevating mechanism 60 is driven with reference to the first threshold value and the second threshold value. The controlling device 50 refers to the various sorts of data as needed to execute the programs, thereby controlling the operation of the nail printing apparatus 1.

In the present embodiment, the storing unit 52 is provided with the nail-image storing area 521 for storing a nail image of the nail T of the user's print finger U1 obtained by the photographing unit 30, a nail-information storing area 522 for storing nail information (nail outline) detected by the nail information detecting unit 512, and a nail-design storing area 523 for storing image data of nail designs to be drawn on the nail T.

The image data of nail designs stored in the nail-design storing area 523 is data representing a rectangle shape. Each piece of data is prepared, representing a rectangle shape which is larger than a size of a general nail T so as to meet various sizes of the nail T.

The controlling unit 51 comprises the photographing-operation controlling unit 511, the nail-information detecting unit 512, the elevation controlling unit 513, the image-drawing controlling unit 514, and a display controlling unit 515. The functions of the photographing-operation controlling unit 511, the nail-information detecting unit 512, the elevation controlling unit 513, the image-drawing controlling unit 514, and the display controlling unit 515 can be realized by CPU of the controlling unit 51, when said CPU runs the programs stored in ROM. The functions realized by CPU of the controlling unit 51 are not limited to those described herein.

The photographing-operation controlling unit 511 controls the photographing unit 30 to photograph the user's print finger U1, thereby obtaining a nail image of the nail T and a finger image including a nail image. The nail image obtained by the photographing unit 30 is stored in the nail-image storing area 521 of the storing unit 52.

The photographing-operation controlling unit 511 controls the photographing unit 30 to photograph a state of the print finger U1 in the print-finger receiving unit 20*a* while the print finger U1 is received in the print-finger receiving unit 20*a*. In this case, the image obtained by the photographing unit 30 is displayed on the displaying unit 13 and the user watches such image to confirm the position of the print finger U1 in the print-finger receiving unit 20*a* and can put the tip of the nail T of the print finger U1 on the nail rest 25 in an appropriate position, when he/she inserts user's finger into the print-finger receiving unit 20*a*.

The nail-information detecting unit 512 detects nail information of the nail T of the print finger U1 from the nail image obtained by the camera 32 (photographing apparatus). In the present embodiment, the nail-information detecting unit 512 detects an outline (nail shape) of the nail T as the nail information.

More specifically, the nail-information detecting unit 512 detects the outline (nail shape) and position of the nail T from the finger image of the print finger U1 obtained by the camera 32, wherein the finger image includes the nail image of the nail T, and obtains information of the outline (nail shape) represented by coordinates (x, y). The method in which the nail-information detecting unit 512 detects the outline (nail shape) of the nail T is not limited to a specific one. For instance, the outline (nail shape) of the nail T can be detected from the finger image (including the nail image of the nail T) of the print finger U1 obtained by the camera 32 on the basis of difference in color between the nail T and the portion other than the nail T. The method in which the nail-information detecting unit 512 detects the outline (nail shape) of the nail T is not limited to the method described herein.

The nail-information detecting unit 512 detects not only the outline (nail shape) of the nail T as the nail information, but also it is possible for the nail-information detecting unit 512 to detect a height (vertical position) and a curvature (nail curvature) of the nail T. To detect the height (vertical position) and curvature of the nail T, the nail T is photographed from different angles to obtain plural nail images. The height (vertical position) and curvature of the nail T are detected from these plural nail images. When the nail-information detecting unit 512 has detected the height (vertical position) and the curvature (nail curvature) of the nail T, an image is drawn on the nail T in consideration of the height (vertical position) and the curvature (nail curvature) of the nail T. As a result, a more precise image can be drawn on the nail T.

The elevation controlling unit 513 controls a driving operation of the elevating mechanism 60 to make the print finger U1 received in the print-finger receiving unit 20*a* move up and down.

As described above, the sensor 65 detects a pressure within the finger placing member 61 and outputs the detected pressure value to the elevation controlling unit 513. The elevation controlling unit 513 controls a fluid filling operation of the pump 63 and a fluid discharging operation of the valve 64 based on the pressure value received from the sensor 65.

The operation of the elevation controlling unit 513 will be described in detail, for controlling the operations of the pump 63 and the valve 64.

Figure 7:
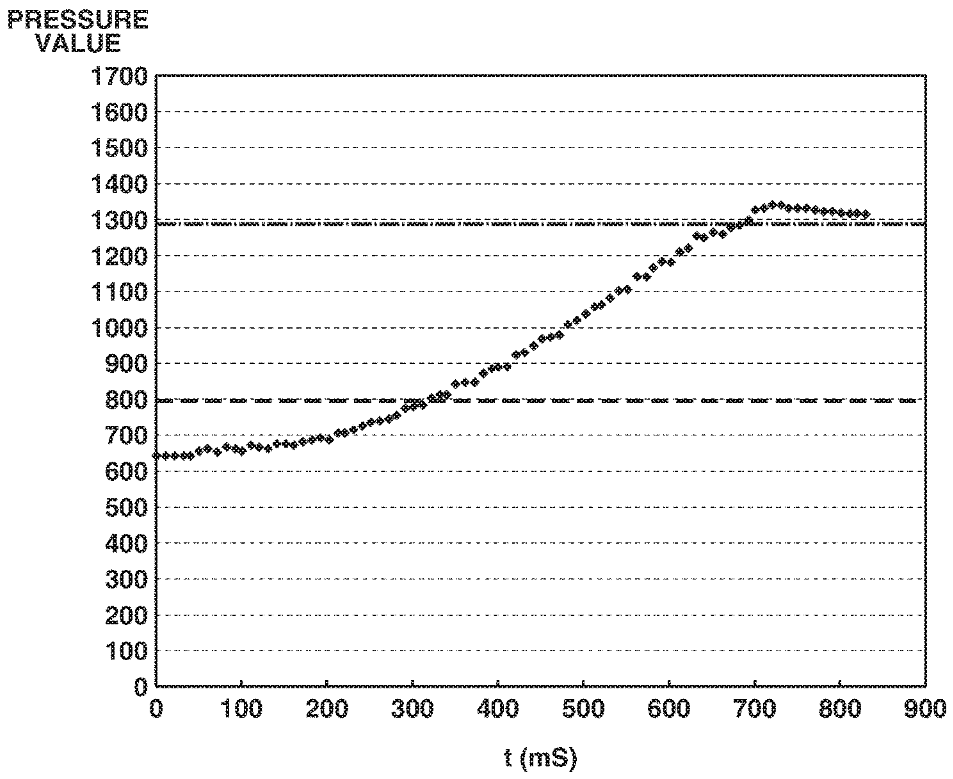
FIG. 7 is a graph indicating an internal pressure of a finger placing member of the print-finger receiving unit.

FIG. 7 is a graph indicating a variation in internal pressure within the finger placing member 61, measured or detected by the sensor 65, while air is being filled into the finger placing member 61.

In FIG. 7, the lateral axis indicates an air filling time in "mS" by the pump 63 and the longitudinal axis indicates a value (A/D converted value) into which the pressure value measured or detected by the sensor 65 has been A/D converted.

In the present embodiment, a pressure value detected or measured by the sensor 65 indicates a difference (gauge pressure) between the absolute pressure and an atmospheric pressure, and in the graph of FIG. 7 indicating A/D converted value, the detected value will never reduce lower than about 650 corresponding to a pressure 0 mmHG. In other words, when the internal pressure of the finger placing member 61 is about 650 or lower, the finger placing member 61 is in a state where it hardly expands (Refer to FIG. 4A). When the finger placing member 61 is in this state, even if the print finger U1 should touch the finger placing member 61, the internal pressure of the finger placing member 61 will not change greatly, and the sensor 65 cannot detect a variation in the internal pressure of the finger placing member 61.

In the present embodiment, when the power of the nail printing apparatus 1 is turned on, the elevation controlling unit 513 makes the pump 63 operate to fill the finger placing member 61 with air (fluid) until the internal pressure in the finger placing member 61 reaches about a first pressure value, and keeps the internal pressure in the finger placing member 61 around at a level that can be detected by the sensor 65. Under this state, the sensor 65 can detect a variation in the internal pressure in the finger placing member 61 and the finger placing member 61 can provide the stand-by state allowing the print finger U1 to be inserted into or removed from the nail printing apparatus 1 (Refer to FIG. 4B).

It is possible to set a proper value to the first pressure value of the internal pressure of the finger placing member 61 for providing the stand-by state, but it is preferable to set the first pressure value to 10 mmHg to 60 mmHg (A/D converted value 650 to 820). In the present embodiment, the first pressure value of the finger placing member 61 is set to around AD converted value 800 as indicated by the broken line in FIG. 7.

When the finger placing member 61 has expanded excessively, the print finger U1 is kept pressed from beneath after the print finger U1 has moved to the image-drawing position where an image can be drawn on the nail T. Therefore, in the present embodiment, when the print finger U1 has moved to the image-drawing position (the finger placing member 61 has been brought in the fixed state), the elevation controlling unit 513 makes the pump 63 and the valve 64 operate to discharge the fluid from the finger placing member 61, thereby maintaining the internal pressure of the finger placing member 61 around at a second pressure value.

It is possible to set a proper value to the second pressure value of the internal pressure of the finger placing member 61, while the finger placing member 61 is kept at the fixed position, but it is preferable to set the second pressure value to 150 mmHg to 220 mmHg (A/D converted value 1110 to 1350). In the present embodiment, the internal pressure of the finger placing member 61 has been set to around AD converted value 1300 as indicated by the dashed line in FIG. 7.

Further, in the present embodiment, a pressure value which is higher than the first pressure value by some value is stored in the storing unit 52 as the first threshold value. When the sensor 65 has detected the internal pressure value of the finger placing member 61 exceeding the first threshold value from the first pressure value, the elevation controlling unit 513 controls the fluid (air) filling operation of the pump 63 such that the finger placing member 61 will expand to bring or move the print finger U1 up to the image-drawing position.

It is possible to set the first threshold value to any proper value, but it is preferable to set the first threshold value to a value which is higher than the first pressure value by 20 mmHg to 40 mmHg, that is, to 30 mmHg to 100 mmHg (A/D converted value 720 to 950). In the present embodiment, the first threshold value is set to A/D converted value 900 as shown in FIG. 8.

When the user has pressed the finger placing member 61 downward by some force with user's print finger U1 placed on the finger placing member 61 as shown in FIG. 4B, the internal pressure of the finger placing member 61 exceeds the first threshold value from the first pressure value. It is considered that a variation in the pressure value caused by a fine operation of the print finger U1 is less than 20 mmHg. Therefore, it is required that the threshold value is set to a value that can be distinguished from the variation in pressure caused by such fine operation of the print finger U1 and it is preferable that the first threshold value is set to a value that is higher than the first pressure value by 20 mmHg to 40 mmHg or more. While the print finger U1 keeps pressing the finger placing member 61 downward, the internal pressure of the finger placing member 61 increases.

Figure 8:
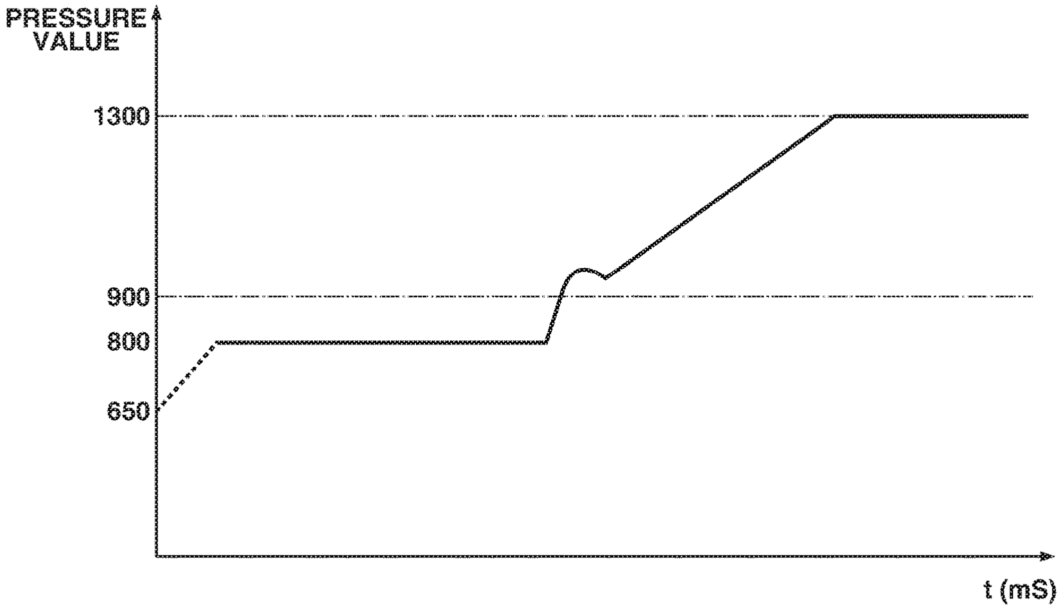
FIG. 8 is a graph indicating a variation in the internal pressure of the finger placing member appearing when the finger placing member is pressed downward with a finger.

As shown in FIG. 8, in the present embodiment, after the internal pressure of the finger placing member 61 has increased to the level which can be detected by the sensor 65 and when the finger placing member 61 is pressed downward by the print finger U1 and the internal pressure of the finger placing member 61 exceeds the first threshold value, the elevation controlling unit 513 determines that an instruction of starting the image drawing operation has been given, and makes the pump 63 fill the finger placing member 61 with air until the print finger is brought to the fixed state allowing to draw an image on the nail T (that is, until the internal pressure of the finger placing member 61 will reach about the second pressure value), thereby performing an upward moving operation of moving the print finger U1 upward (Refer to FIG. 4C).

In this way, the user is allowed to fix user's print finger U1 properly in the nail printing apparatus 1 for drawing an image on the nail T without operating a button operation with other hand.

As shown in FIG. 8, the pressure value starts rising since a short time elapses after the internal pressure of the finger placing member 61 exceeds the first threshold value. In other words, the graph of FIG. 8 indicates that there is somewhat of a time lag between a time when the control program recognizes that the internal pressure of the finger placing member 61 has reached the first threshold value and then makes the pump 63 operate to fill the finger placing member 61 with air and a time when the finger placing member 61 expands.

Since there are cases where the user unwittingly moves user's print finger U1, the elevation controlling unit 513 may be allowed to determine that the instruction of starting the image drawing operation has been given not just after the time when the internal pressure of the finger placing member 61 has just exceeded the first threshold value, but at the time when the internal pressure of the finger placing member 61 exceeding the first threshold value has been kept for a prescribe time period, for example, 2 or 3 seconds.

Figure 9:
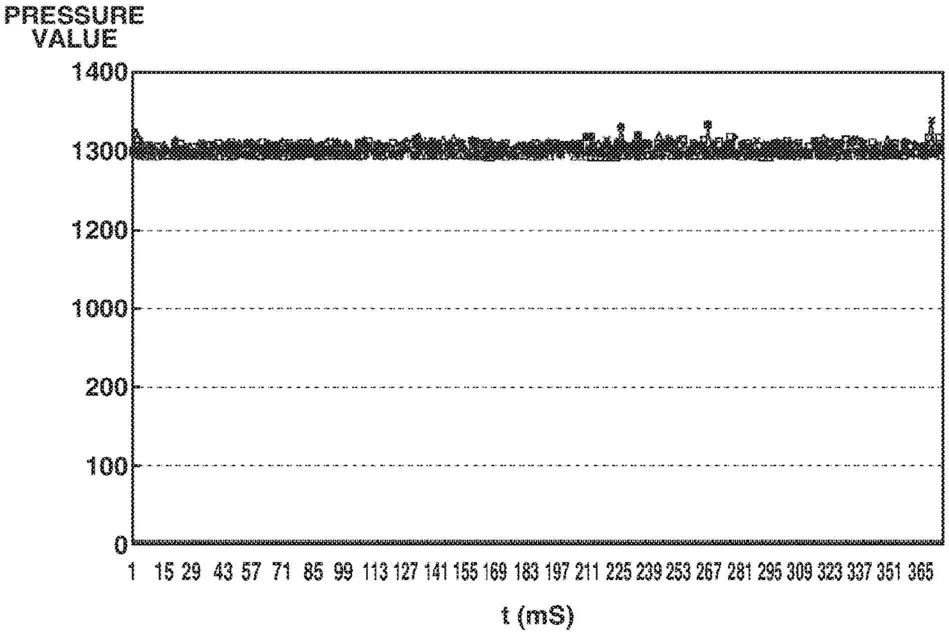
FIG. 9 is a graph indicating the internal pressure of the finger placing member of the print-finger receiving unit, when the finger placing member is brought to the fixed state.

After the print finger U1 has been brought up to the image-drawing position, to prevent the finger placing member 61 form pressing the print finger U1 excessively, the elevation controlling unit 513 controls the operations of the pump 63 and valve 64 to keep the internal pressure of the finger placing member 61 constant around at A/D converted value 1300 (the second pressure value) as shown in FIG. 7 to FIG. 9.

The sensor 65 has detected 8 times the internal pressure of the finger placing member 61 with the print finger brought to the image-drawing position, and the result of detection is indicated in FIG. 9. As indicated in FIG. 9, the internal pressure of the finger placing member 61 is maintained constant around at the A/D converted value 1300 (second pressure value) while the finger placing member 61 is kept in the fixed state.

In the present embodiment, a pressure value which is higher than the second pressure value by some value is stored in the storing unit 52 as the second threshold value. When the sensor 65 has detected the internal pressure of the finger placing member 61 exceeding the second threshold value from the second pressure value, the elevation controlling unit 513 ceases the operation of the pump 63 and controls the fluid discharging operation of the valve 64 such that the finger placing member 61 will shrink to bring or move the print finger U1 down to the stand-by position.

It is possible to set the second threshold value to any proper value, but it is preferable to set the second threshold value to a value which is higher than the second pressure value by 20 mmHg to 40 mmHg or more, that is, to 170 mmHg to 260 mmHg (A/D converted value 1180 to 1480). In the present embodiment, the second threshold value is set to A/D converted value 1400 as shown in FIG. 10.

When the internal pressure of the finger placing member 61 has exceeded the second threshold value from the second pressure value, the finger placing member 61 is pressed down by the user with user's print finger U1 by some force with the user's print finger U1 fixed between the finger placing member 61 and the under surface of the finger pressing plate 24, as shown in FIG. 5A. It is considered that the variation in the pressure value caused by a fine operation of the print finger U1 is less than 20 mmHg. Therefore, it is required that the threshold value is set to a value that can be distinguished from the variation in pressure caused by such fine operation of the print finger U1 and the second threshold value is set to a value that is higher than the second pressure value by 20 mmHg to 40 mmHg or more. While the finger placing member 61 is kept pressed down by the print finger U1, the internal pressure of the finger placing member 61 increases.

Figure 10:
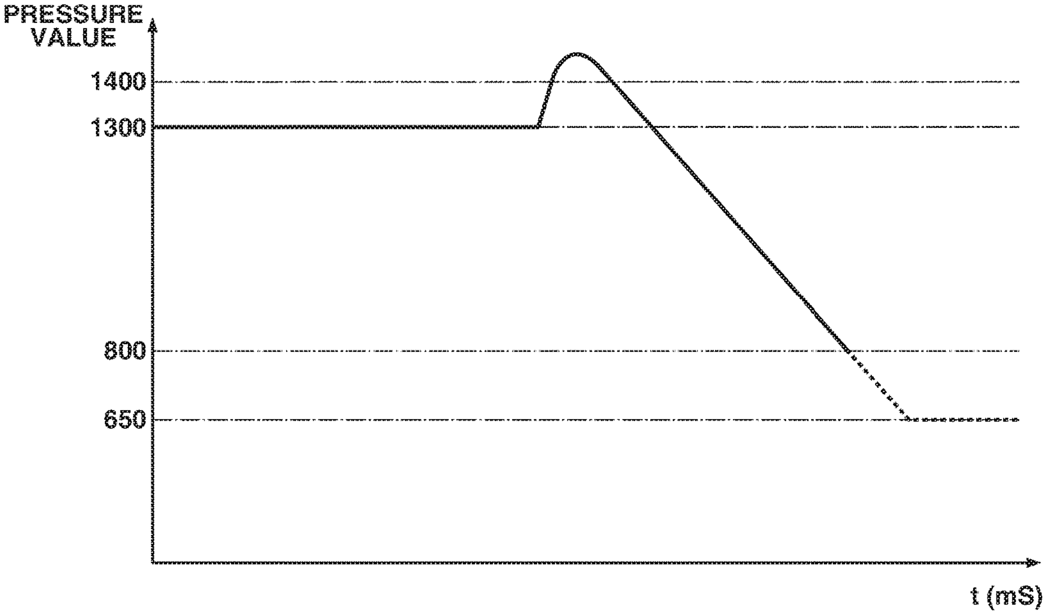
FIG. 10 is a graph indicating a variation in the internal pressure of the finger placing member appearing when the finger placing member in the fixed state is pressed downward with a finger.

In the present embodiment, when the finger placing member 61 is brought in the fixed state (that is, after the internal pressure of the finger placing member 61 reaches A/D converted value 1300 or the second pressure value), and then is pressed by the print finger U1 to increase the internal pressure of the finger placing member 61 until the internal pressure exceeds the second threshold value, as shown in FIG. 10, the elevation controlling unit 513 determines that an instruction of releasing the fixed state has been given, and ceases the operation of the pump 63 and makes the valve 64 open the fluid route, allowing air to discharge from the finger placing member 61 (Refer to FIG. 5B). Then, the internal pressure of the finger placing member 61 decreases lower than the first pressure value or less, and the finger placing member 61 is brought to the stand-by state, where the print finger U1 can be inserted onto or removed therefrom (Refer to FIG. 5C).

In this manner, the user can release user's print finger U1 from the fixed state only with operation of the print finger U1 without manipulating the operation button with other hand.

As shown in FIG. 10, the pressure value starts decreasing since a short time elapses after the internal pressure of the finger placing member 61 exceeds the second threshold value. In other words, the graph of FIG. 10 indicates that there is somewhat of a time lag between a time when the control program recognizes that the internal pressure of the finger placing member 61 has reached the second threshold value and then makes the valve 64 operate to discharge air from the finger placing member 61 and a time when the finger placing member 61 shrinks.

Since there are cases when the user unwittingly moves user's print finger U1, the elevation controlling unit 513 may be allowed to determine that the instruction of releasing the fixed state has been given not just after the time when the internal pressure of the finger placing member 61 has just exceeded the second threshold value, but at the time when the internal pressure of the finger placing member 61 exceeding the second threshold value has been kept for a prescribe time period, for example, 2 or 3 seconds.

The image-drawing controlling unit 514 sends the image drawing heads 46 of the image drawing unit 40 image drawing data based on the image data of the nail design, and controls the image drawing unit 40 such that the image drawing heads 46 draws an image on the nail T based on the image drawing data.

In the present embodiment, the controlling unit 51 arranges the image data of a nail design so as to meet the outline of the nail T detected by the nail information detecting unit 512, wherein the image data of a nail design is selected in accordance with the manipulation of the operation unit 12 by the user, whereby image drawing data is generated, which defines an image drawing region within the outline of the nail T detected by the nail information detecting unit 512. The image-drawing controlling unit 514 outputs the image drawing data to the image drawing heads 46.

As described above, the image data of a nail design stored in the nail-design storing area 523 is data representing a rectangle shape that is large in size. The image drawing data is generated by properly reducing in size the image data of a nail design such that the image data of a nail design will meet the outline of the nail T.

The specific method of generating the image drawing data which meets the outline of the nail T is not specifically restricted, but it is possible to generate the image drawing data by reducing in size a nail design represented by the image data to an extent that the nail design will not exceed the outline of the nail T, on which such nail design is to be drawn.

The image-drawing controlling unit 514 controls the image drawing unit 40 so as to start drawing an image, when the sensor 65 detects that the internal pressure of the finger placing member 61 has increased to the second pressure value (A/D converted value 1300 in the present embodiment). Further, the image-drawing controlling unit 514 controls the image drawing unit 40 so as to cease drawing an image, when the sensor 65 has detected the internal pressure of the finger placing member 61 exceeding the second threshold value (A/D converted value 1400 in the present embodiment) from the second pressure value. In this manner, the user can make the image printing apparatus 1 start or cease the image drawing operation only by operation of user's print finger U1 without manipulating the operation button with other hand.

The display controlling unit 515 controls the displaying unit 13 to display various screens thereon. In the present embodiment, various sorts of information are displayed on the displaying unit 13, such as an image ("finger image") of a photographed print finger U1, a nail image (an image of the outline of the nail T) included in the finger image, the design selection screen for selecting an image ("nail design") to be drawn on the nail T, a thumb-nail image for confirmation of the selected design image, the instruction screen for indicating various instructions, the notice screen, and the warning screen.

The method of drawing an image, executed in the nail printing apparatus 1 will be described with reference to the flow charts of FIG. 11 to FIG. 13.

Figure 11:
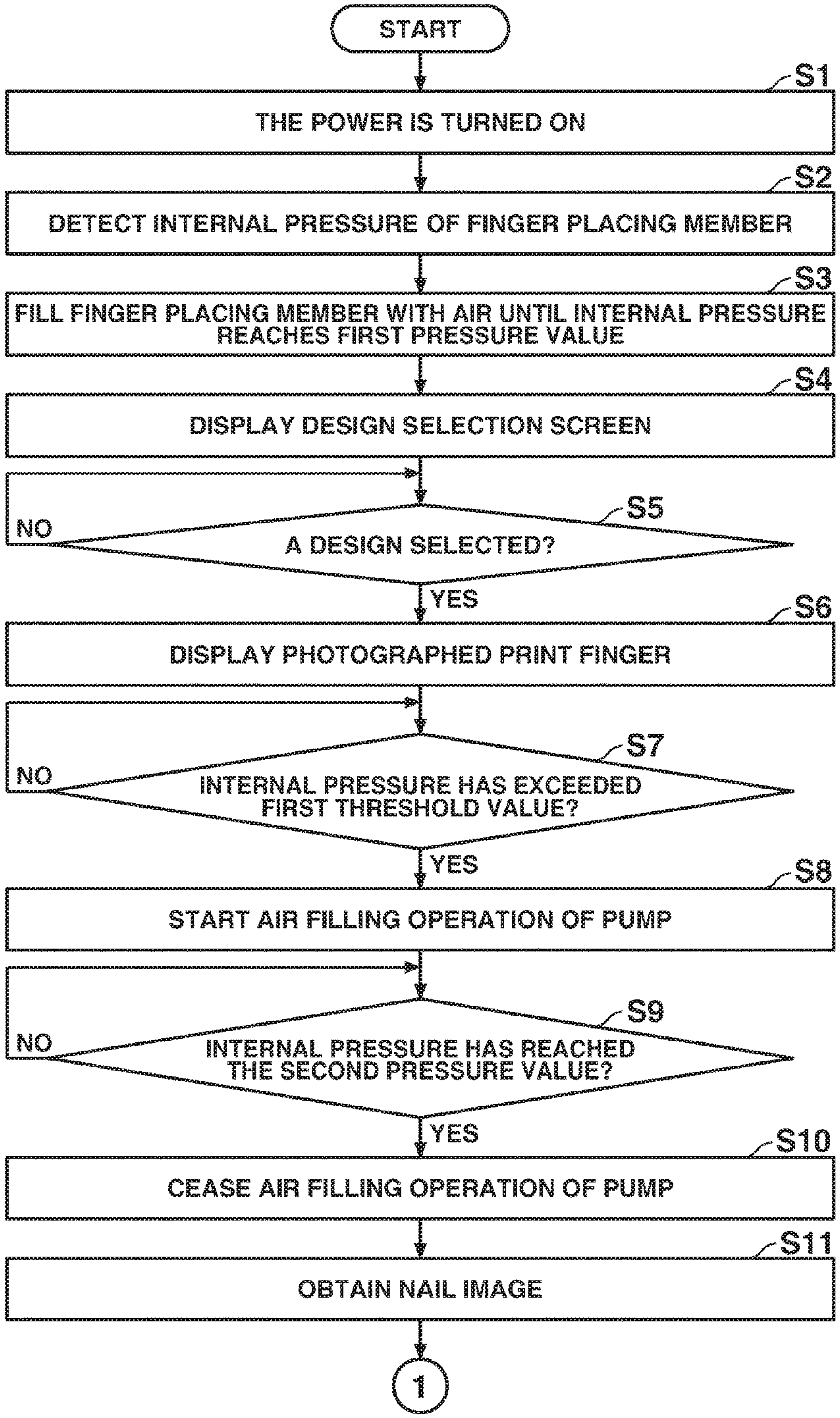
FIG. 11 and FIG. 12 are flow charts of an image drawing process performed in the nail printing apparatus according to the embodiment of the invention.
Figure 12:
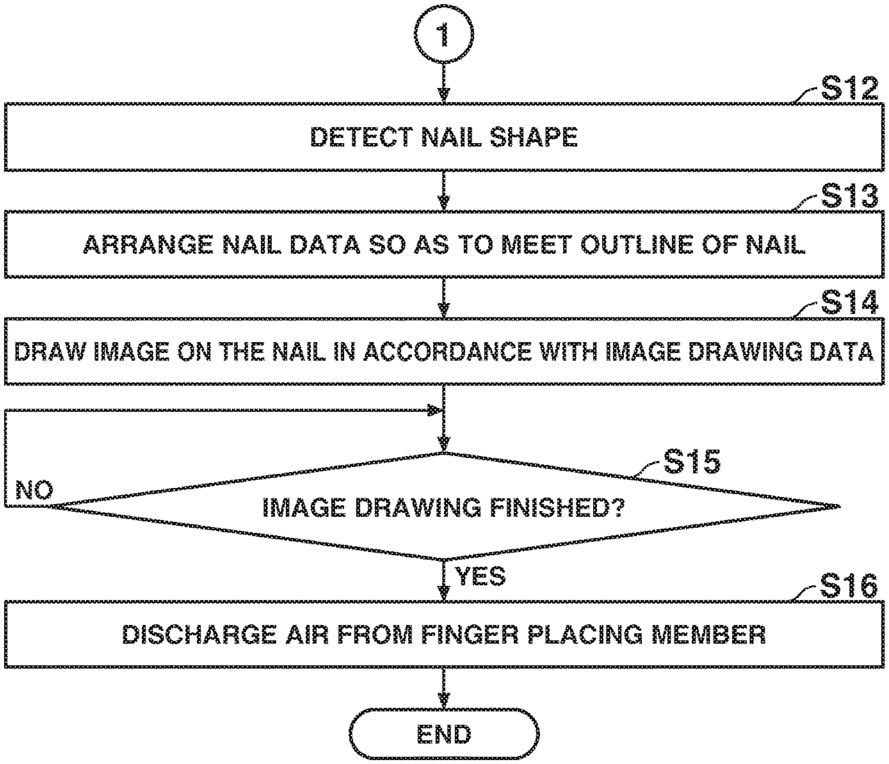

When drawing an image on the nail using the present nail printing apparatus 1, the user turns on the power switch to drive the controlling device 50 (step S1 in FIG. 11).

When the power of the nail printing apparatus 1 is turned on, the sensor 65 starts detecting the internal pressure of the finger placing member 61 (step S2), and outputs the detected pressure value to the elevation controlling unit 513. The sensor 65 always measures the internal pressure of the finger placing member 61 until the image drawing process finishes. The elevation controlling unit 513 makes the pump 63 operate to fill air into the finger placing member 61 until the internal pressure in the finger placing member 61 reaches about the first pressure value (A/D converted value 800 in the present embodiment as shown in FIG. 7) (step S3). In this state, the sensor 65 can detect a variation in the internal pressure of the finger placing member 61 and the finger placing member 61 is brought to the stand-by state, allowing the print finger U1 to be inserted into or removed from the nail printing apparatus 1 (Refer to FIG. 4B).

The display controlling unit 515 makes the displaying unit 13 display the design selection screen, prompting the user to select a nail design (step S4). Manipulating the design selecting button 121 of the operation unit 12, the user selects user's desired nail design out of plural nail designs displayed on the design selection screen.

The controlling device 50 judges whether any nail design has been selected by the user (step S5). When the operation unit 12 outputs no instruction of selecting a nail design, the controlling device 50 determines that no nail design has been selected (NO at step S5), and repeatedly judges whether a nail design has been selected (step S5). Meanwhile, when the user manipulates the design selecting button 121 of the operation unit 12 to select a nail design, and the operation unit 12 outputs an instruction of selecting a nail design, the controlling device 50 determines that a nail design has been selected (YES at step S5).

The photographing unit 30 photographs the inside of the print-finger receiving unit 20*a* and when the print finger U1 is inserted to the print-finger receiving unit 20*a*, the print finger U1 photographed by the photographing unit 30 is displayed on the displaying unit 13 (step S6). If a frame is displayed on the displaying unit 13, which frame indicates a proper position of the print finger U1 in the print-finger receiving unit 20*a*, it will be convenient for the user when inserting user's print finger U1 into a proper position in the print-finger receiving unit 20*a*.

The user confirms the position of the print finger U1 in the print-finger receiving unit 20*a* on the displaying unit 13. When the user determines that the print finger U1 has been placed on the proper position, then he/she presses the finger placing member 61 down with the print finger U1 (Refer to FIG. 4B).

As described above, the sensor 65 always measures or detects the internal pressure of the finger placing member 61 and outputs the detected value to the elevation controlling unit 513. The elevation controlling unit 513 judges whether the value (the internal pressure of the finger placing member 61) detected by the sensor 65 has exceeded the first threshold value (A/D converted value 900 shown in FIG. 7 and FIG. 8) from the first pressure value (A/D converted value 800 in the present embodiment) (step S7). When it is determined at step S7 that the value detected by the sensor 65 has not exceeded the first threshold value (NO at step S7), then the elevation controlling unit 513 will make judgment repeatedly at step S7. Meanwhile, when it is determined at step S7 that the internal pressure of the finger placing member 61 has exceeded the first threshold value from the first pressure value (YES at step S7), then the elevation controlling unit 513 makes the pump 63 start its air filling operation to expand the finger placing member 61, bringing the print finger U1 up to the image-drawing position (step S8). In this way, the print finger U1 is brought upward until the back side of the print finger U1 abuts on the under surface of the finger pressing plate 24 as shown in FIG. 4C. The tip of the nail T is placed on the nail rest 25.

The elevation controlling unit 513 judges whether the value (the internal pressure of the finger placing member 61) detected by the sensor 65 has reached the second pressure value (A/D converted value 1300 in the present embodiment) (step S9). When it is determined at step S9 that the value detected by the sensor 65 has not reached the second pressure value (NO at step S9), then the elevation controlling unit 513 will make judgment repeatedly at step S9. Meanwhile, when it is determined at step S9 that the internal pressure of the finger placing member 61 has reached the second pressure value (YES at step S9), the elevation controlling unit 513 makes the pump 63 cease its air filling operation (step S10).

Even after the internal pressure of the finger placing member 61 reaches the second pressure value, the sensor 65 measures or detects the internal pressure and outputs the measured internal pressure to the elevation controlling unit 513. When the internal pressure is too high, the elevation controlling unit 513 ceases the air filling operation of the pump 63 and makes the valve open to discharge air from the finger placing member 61 to keep the internal pressure of the finger placing member 61 around at the second pressure value. Meanwhile, when the internal pressure decreases, the elevation controlling unit 513 makes the valve close and operates the pump 63 to fill the finger placing member 61 with air.

When the internal pressure of the finger placing member 61 has reached the second pressure value, the photographing-operation controlling unit 511 controls the photographing unit 30 to photograph the nail T of the print figure U1, obtaining a nail image (step S11). When the nail image has been obtained, the nail-information detecting unit 512 detects a nail shape (outline of the nail T) as the nail information from the nail image (step S12 in FIG. 12).

When the outline of the nail T has been detected, the controlling unit 51 arranges the image data of a nail design so as to meet the outline of the nail T detected by the nail-information detecting unit 512 (step S13), whereby image drawing data is generated, which defines an image drawing region within the outline of the nail T detected by the nail information detecting unit 512.

The image-drawing controlling unit 514 outputs the image drawing data to the image drawing heads 46, and makes the image drawing heads 46 draw an image on the nail region (within the outline of the nail T detected by the nail information detecting unit 512) in accordance with image drawing data (step S14).

The image-drawing controlling unit 514 judges whether an image has been drawn in the nail region, that is, whether an image drawing has finished (step S15). When it is determined at step S15 that an image has not been drawn in the nail region, that is, that the image drawing has not finished (NO at step S15), then the image-drawing controlling unit 514 will make judgment repeatedly at step S15. When it is determined at step S15 that an image has been drawn in the nail region (YES at step S15), then the image-drawing controlling unit 514 finishes the image drawing process on the nail T.

When the image drawing process finished, the elevation controlling unit 513 ceases the operation of the pump 63 and makes the valve 64 open to discharge air from the finger placing member 61 (until the internal pressure of the finger placing member 61 decreases to the first pressure value or less), bringing the same to the stand-by state where the print finger U1 can be removed from the apparatus (step S16).

If the user wants to print other finger nail (nail T), then the user inserts the other finger and repeats the above process again.

In the present embodiment, the user is allowed to release user's print finger U1 from the fixed state and remove user's print finger U1 from the apparatus, if he/she wants, even after the print finger U1 is fixed at the image drawing position.

Figure 13:
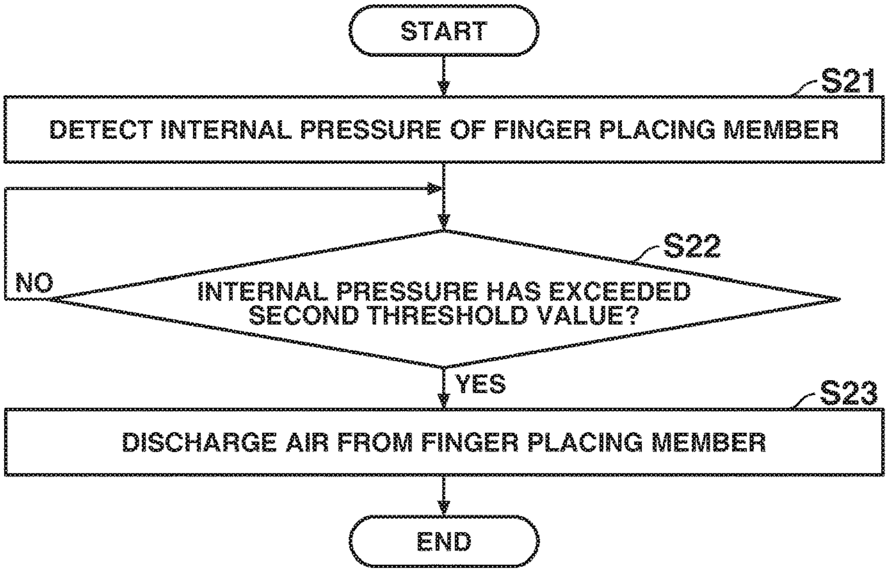
FIG. 13 is a flow chart of a process of ceasing the image drawing process in the nail printing apparatus according to the embodiment of the invention.

More specifically, even after the internal pressure of the finger placing member 61 reaches the second pressure value (A/D converted value 1300 in the present embodiment) and the print finger U1 is fixed to the image drawing position, the sensor 64 measures the internal pressure of the finger placing member 61 and successively outputs the measured value to the elevation controlling unit 513 (step S21 in FIG. 13). The elevation controlling unit 513 judges whether the value (the internal pressure of the finger placing member 61) detected by the sensor 65 has exceeded the second threshold value (A/D converted value 1400 in the present embodiment) from the second pressure value (step S22). When it is determined at step S22 that the value detected by the sensor 65 has not exceeded the second threshold value (NO at step S22), then the elevation controlling unit 513 will make judgment repeatedly at step S22. Meanwhile, when it is determined at step S22 that the internal pressure of the finger placing member 61 has exceeded the second threshold value (YES at step S22), the elevation controlling unit 513 makes the pump 63 cease its air filling operation and the valve 64 open to discharge air from the finger placing member 61, bringing the print finger U1 to the stand-by position where the print finger can be removed from the apparatus (step S23).

In this way, even before the image drawing process has not yet finished, the user is allowed to press the finger placing member 61 down with user's print finger U1 and remove user's print finger U1 from the apparatus.

As described above, the sensor 65 detects or measures the internal pressure of the finger placing member 61 and sends the detected result to the elevation controlling unit 513. The elevation controlling unit 513 controls the fluid filling operation of the pump 63 and the fluid discharging operation of the valve 64 depending on the detected result sent from the sensor 65. With this configuration, when the finger placing member 61 is pressed down with the print finger U1, the operation of the print finger U1 of pressing the finger placing member 61 down is detected. The detected operation of the print finger U1 of pressing the finger placing member 61 functions as the switch button of the operation unit 12 and therefore, the user can set user's print finger U1 and/or start the image drawing process only by operating user's print finger U1 without manipulating the operation button with other hand. The present nail printing apparatus can smoothly be operated by either a left-hander or a right-hander without requiring troublesome button operation, while the image drawn on the nail T is dried, and the user is indicating another instruction with other hand, and/or is preparing for using the apparatus.

In the present embodiment, when the sensor 65 has detected the internal pressure of the finger placing member 61 exceeding the first threshold value from the first pressure value (at which the finger placing member 61 is brought to the stand-by state, allowing the print finger U1 to be inserted into or removed from the nail printing apparatus 1), the elevation controlling unit 513 controls the fluid filling operation of the pump 63 to expand the finger placing member 61, moving the print finger U1 up to the image drawing position. Even when the user inserts user's print finger U1 into the print-finger receiving unit 20*a*, the print finger U1 is never fixed firmly on the print-finger receiving unit 20*a*. But when the print finger U1 presses the finger placing member 61 down, then the print finger U1 is automatically fixed thereon. In this way, the user is allowed to operate the nail printing apparatus 1 intuitively and in a simple manner.

Further, in the present embodiment, when the sensor 65 has detected the internal pressure of the finger placing member 61 exceeding the second threshold value from the second pressure value (at which the finger placing member 61 brings the print finger U1 up to the image drawing position and fixes thereto), the elevation controlling unit 513 ceases the operation of the pump 63 and controls the fluid discharging operation of the valve 64 to make the finger placing member 61 shrink, bringing the print finger U1 down to the stand-by position. In this way, even after the print finger U1 has been fixed firmly on the finger placing member 61, the user can release the print finger U1 from the fixed state simply by pressing the finger placing member 61 downward with user's print finger. In case an urgent matter happens while the user is drawing an image on the nail T, operating the print finger U1 intuitively the user can release user's print finger U1 from the fixed state and promptly remove user's print finger U1 from the apparatus in a simple manner.

Further, in the present embodiment, when the sensor 65 detects that the internal pressure of the finger placing member has increased to the second pressure value, the image-drawing controlling unit 514 starts the image drawing process, whereby without required to operate the image drawing button, the user can make the image drawing operation start automatically simply by pressing the finger placing member 61 down with user's print finger U1 and can control the operation of the nail printing apparatus by a simple and intuitive movement.

Furthermore, in the present embodiment, when the sensor 65 detects the internal pressure of the finger placing member 61 exceeding the second threshold value form the second pressure value, the image-drawing controlling unit 514 ceases the image drawing process, whereby even after the print finger U1 has been fixed on the finger placing member 61, without manipulating an image-drawing ceasing button, the user can cease the image drawing operation simply by pressing the finger placing member 61 down with user's print finger. Therefore, in case an urgent matter happens while drawing an image, the user is allowed to promptly cease the image drawing operation by an intuitive movement.

Although specific embodiments of the invention have been described in the foregoing detailed description, it will be understood that the invention is not limited to the particular embodiments described herein, but modifications and rearrangements may be made to the disclosed embodiments while remaining within the scope of the invention.

For example, in the f embodiments of the invention, the described image drawing unit is provided with the image drawing head of ink jet system, but the image drawing system is not restricted to the ink jet system. An image drawing unit of a pen plotter system, in which pens are held in pen holders, can be employed in place of the ink jet system. An image drawing unit may be used, which is provided with heads of the ink jet system and pens of the pen plotter system.

Since it is possible for the pen of the pen plotter to draw an image with ink regardless of particle size and viscosity of ink, the image drawing unit provided with such pens can draw an image using ink including large particles and lames and can apply on a nail a beautiful nail art rich in variation.

The embodiment of the nail printing apparatus 1, has been described herein, in which a variation in the internal pressure of the finger placing member 61 pressed with the print finger U1 is detected by the sensor 65, and the operations such as the starting of fixing the print finger, the releasing of the fixed print finger, the starting of the image drawing operation and the ceasing of the image drawing operation are controlled depending on the result of the detecting the internal pressure by the sensor 65. Operations to be controlled depending on the result of the detecting the internal pressure by the sensor 65 are not restricted to the above described operations.

For example, it is possible to control not all the above operations but only some of them are controlled depending on the result of the detecting the internal pressure by the sensor 65.

Further, it is possible to change the selected nail design depending on a time duration, in which the finger placing member 61 is being pressed with the print finger U1 or on times for which the finger placing member 61 is pressed with the print finger U1. Further, it is possible to arrange such that complex control is performed on the apparatus depending on the result of the detecting the internal pressure by the sensor 65.

The embodiment of the nail printing apparatus 1 has been described herein, in which the user inserts user's fingers into the apparatus one by one and draws an image on it. But the present invention may be applied to an apparatus which allows the user to insert user's four fingers simultaneously and draw an image on the nails of them sequentially. Further, the present invention may be applied to an apparatus which allows the user to insert user's fingers of both hands simultaneously and draw an image on the nails of them continuously.

With the present configuration of the nail printing apparatus 1, the operations such as the fixing of the print finger, the releasing of the fixed print finger, the starting of the image drawing operation and the ceasing of the image drawing operation can be controlled only depending on the movement of the print finger U1 inserted into the print-finger receiving unit 20*a*. Therefore, it is possible for the user to manipulate the various operation buttons even when user's both hands are inserted into the apparatus simultaneously.

The embodiment of the nail printing apparatus 1, has been described herein, in which one values are for the first threshold value and the second threshold value, respectively. But it is possible to prepare plural values for the first threshold value and the second threshold value, respectively, and allow the user to select ones according to user's desire or finger force.

The embodiment of the nail printing apparatus 1, has been described herein, in which the storing unit 52 of the controlling device 50 is provided with the nail-image storing area 521, the nail-information storing area 522, and the nail-design storing area 523. It is possible to provide the nail-image storing area 521, the nail-information storing area 522, and the nail-design storing area 523 in a separate storing unit other than the storing unit 52 (ROM, RAM).

The embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:

1. A nail printing apparatus comprising:

an image drawing unit which draws an image on a nail of a finger or a toe of a user;

a placing unit which is configured to be expandable and contractible by charging and discharging a fluid, and which is configured to have the finger or the toe placed thereon;

an elevation mechanism which is engaged with the placing unit to move the finger or the toe placed on the placing unit from a stand-by position up to an image drawing position and vice versa, wherein the stand-by position allows the user to insert the finger or the toe into the apparatus or remove the finger or the toe from the apparatus, and the image drawing position allows the image drawing unit to draw an image on the nail of the finger or the toe placed on the placing unit; and an elevation controlling unit which controls an operation of the elevation mechanism of moving the finger or the toe between the stand-by position and the image drawing position, based on a variation in an internal pressure of the placing unit caused by an operation of the finger or the toe placed on the placing unit, pressing the placing unit.

2. The nail printing apparatus according to claim 1, further comprising:

a pressing unit which presses the back of the finger or the back of the toe placed on the placing unit, on whose nail an image is to be drawn by the image drawing unit, wherein when the finger or the toe is inserted between the placing unit and the pressing unit, the placing unit moves the finger or the toe upward to hold said finger or said toe between the placing unit and the pressing unit.

3. The nail printing apparatus according to claim 1, wherein the elevation mechanism comprises:

a pump which fills the placing unit with the fluid;

a valve which discharges the fluid from the placing unit; and a sensor which detects the internal pressure of the placing unit, and wherein the elevation controlling unit controls a fluid filling operation of the pump and a fluid discharging operation of the valve depending on a result detected by the sensor.

4. The nail printing apparatus according to claim 3, wherein:

the placing unit has the internal pressure of a first pressure value, when the placing unit holds the finger or the toe at the stand-by position, a first threshold value is set to a value that is higher than the first pressure value, and the elevation controlling unit controls the fluid filling operation of the pump to expand the placing unit, moving the finger or the toe upward, when the sensor has detected the internal pressure of the placing unit exceeding the first threshold value from the first pressure value.

5. The nail printing apparatus according to claim 3, wherein:

the internal pressure of the placing unit has a second pressure value, when the placing unit holds the finger or the toe at the image drawing position, a second threshold value is set to a value that is higher than the second pressure value, and the elevation controlling unit controls the fluid discharging operation of the valve to shrink the placing unit, moving the finger or the toe downward, when the sensor has detected the internal pressure of the placing unit exceeding the second threshold value from the second pressure value.

6. The nail printing apparatus according to claim 5, further comprising:

an image-drawing operation controlling unit which controls an image drawing operation of the image drawing unit, wherein the image-drawing operation controlling unit makes the image drawing unit start the image drawing operation, when the sensor detects that the internal pressure of the placing unit has increased to the second pressure value.

7. The nail printing apparatus according to claim 6, wherein the image-drawing operation controlling unit makes the image drawing unit cease the image drawing operation, when the sensor has detected the internal pressure of the placing unit exceeding the second threshold value from the second pressure value.

8. A method of controlling a nail printing apparatus, wherein the nail printing apparatus comprises: an image drawing unit which draws an image on a nail of a finger or a toe of a user; a placing unit which is configured to be expandable and contractible by charging and discharging a fluid, and which is configured to have the finger or the toe placed thereon; an elevation mechanism which is engaged with the placing unit to move the finger or the toe placed on the placing unit from a stand-by position up to an image drawing position and vice versa, wherein the stand-by position allows the user to insert the finger or the toe into the apparatus or remove the finger or the toe from the apparatus, and the image drawing position allows the image drawing unit to draw an image on the nail of the finger or the toe placed on the placing unit; and a pressing unit which presses the back of the finger or the back of the toe, on whose nail an image is to be drawn, the method comprising:

controlling an operation of the elevation mechanism of moving the finger or the toe between the stand-by position and the image drawing position, based on a variation in an internal pressure of the placing unit caused by an operation of the finger or the toe inserted between the placing unit and the pressing unit, pressing the placing unit.

9. The method of controlling the nail printing apparatus according to claim 8, wherein the elevation mechanism comprises: a pump which fills the placing unit with the fluid; a valve which discharges the fluid from the placing unit; and a sensor which detects the internal pressure of the placing unit, and wherein the method further comprises:

controlling a fluid filling operation of the pump and a fluid discharging operation of the valve depending on a result detected by the sensor.

10. The method of controlling the nail printing apparatus according to claim 9, wherein:

the placing unit has the internal pressure of a first pressure value, when the placing unit holds the finger or the toe at the stand-by position, and a first threshold value is set to a value that is higher than the first pressure value, and the method further comprises:

controlling the fluid filling operation of the pump to expand the placing unit, moving the finger or the toe upward, when the sensor has detected the internal pressure of the placing unit exceeding the first threshold value from the first pressure value.

11. The method of controlling the nail printing apparatus according to claim 9, wherein:

the internal pressure of the placing unit reaches a second pressure value, when the placing unit holds the finger or the toe at the image drawing position, and a second threshold value is set to a value that is higher than the second pressure value, and the method further comprises:

controlling the fluid discharging operation of the valve to shrink the placing unit, moving the finger or the toe downward, when the sensor has detected the internal pressure of the placing unit exceeding the second threshold value from the second pressure value.

12. The method of controlling the nail printing apparatus according to claim 11, further comprising:

controlling the image drawing unit so as to start an image drawing operation, when the sensor detects that the internal pressure of the placing unit has increased to the second pressure value.

13. The method of controlling the nail printing apparatus according to claim 12, further comprising:

controlling the image drawing unit so as to cease the image drawing operation, when the sensor has detected the internal pressure of the placing unit exceeding the second threshold value from the second pressure value.

14. A non-transitory computer-readable recording medium having a program stored thereon that is executable by a computer of a nail printing apparatus, wherein the nail printing apparatus comprises: an image drawing unit which draws an image on a nail of a finger or a toe of a user; a placing unit which is configured to be expandable and contractible by charging and discharging a fluid, and which is configured to have the finger or the toe placed thereon; an elevation mechanism which is engaged with the placing unit to move the finger or the toe placed on the placing unit from a stand-by position up to an image drawing position and vice versa, wherein the stand-by position allows the user to insert the finger or the toe into the apparatus or remove the finger or the toe from the apparatus, and the image drawing position allows the image drawing unit to draw an image on the nail of the finger or the toe placed on the placing unit; and a pressing unit which presses the back side of the finger or the back side of the toe, on whose nail an image is to be drawn, the program being executable by the computer to perform functions comprising:

controlling an operation of the elevation mechanism of moving the finger or the toe between the stand-by position and the image drawing position, based on a variation in an internal pressure of the placing unit caused by an operation of the finger or the toe inserted between the placing unit and the pressing unit, pressing the placing unit.

15. The non-transitory computer-readable recording medium according to claim 14, wherein the elevation mechanism comprises: a pump which fills the placing unit with the fluid; a valve which discharges the fluid from the placing unit; and a sensor which detects the internal pressure of the placing unit, and wherein the functions further comprise:

controlling a fluid filling operation of the pump and a fluid discharging operation of the valve depending on a result detected by the sensor.

16. The non-transitory computer-readable recording medium according to claim 15, wherein:

the placing unit has the internal pressure of a first pressure value, when the placing unit holds the finger or the toe at the stand-by position, a first threshold value is set to a value that is higher than the first pressure value, and the functions further comprise:

controlling the fluid filling operation of the pump to expand the placing unit, moving the finger or the toe upward, when the sensor has detected the internal pressure of the placing unit exceeding the first threshold value from the first pressure value.

17. The non-transitory computer-readable recording medium according to claim 15, wherein:

the internal pressure of the placing unit reaches a second pressure value, when the placing unit holds the finger or the toe at the image drawing position, a second threshold value is set to a value that is higher than the second pressure value, and the functions further comprise:

controlling the fluid discharging operation of the valve to shrink the placing unit, moving the finger or the toe downward, when the sensor has detected the internal pressure of the placing unit exceeding the second threshold value from the second pressure value.

* * * * *